(12) United States Patent
Park et al.

(10) Patent No.: US 11,488,576 B2
(45) Date of Patent: Nov. 1, 2022

(54) ARTIFICIAL INTELLIGENCE APPARATUS FOR GENERATING TEXT OR SPEECH HAVING CONTENT-BASED STYLE AND METHOD FOR THE SAME

(71) Applicant: LG ELECTRONICS INC., Seoul (KR)

(72) Inventors: Jisoo Park, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 16/492,842

(22) PCT Filed: May 21, 2019

(86) PCT No.: PCT/KR2019/006093
§ 371 (c)(1),
(2) Date: Sep. 10, 2019

(87) PCT Pub. No.: WO2020/235712
PCT Pub. Date: Nov. 26, 2020

(65) Prior Publication Data
US 2021/0193110 A1 Jun. 24, 2021

(51) Int. Cl.
*G10L 13/10* (2013.01)
*G10L 13/07* (2013.01)
*G10L 13/047* (2013.01)

(52) U.S. Cl.
CPC ............ *G10L 13/047* (2013.01); *G10L 13/10* (2013.01)

(58) Field of Classification Search
CPC ....... G10L 13/00; G10L 13/10; G10L 15/187; G06F 3/16
See application file for complete search history.

(56) References Cited

U.S. PATENT DOCUMENTS

| | | | | |
|---|---|---|---|---|
| 5,555,343 | A * | 9/1996 | Luther | G06F 3/16 704/260 |
| 8,103,505 | B1 | 1/2012 | Silverman et al. | |
| 9,292,487 | B1 * | 3/2016 | Weber | G10L 15/063 |
| 2010/0042410 | A1 * | 2/2010 | Stephens, Jr. | G10L 13/08 704/260 |
| 2011/0093272 | A1 * | 4/2011 | Isobe | G10L 13/10 704/258 |

(Continued)

FOREIGN PATENT DOCUMENTS

| | | |
|---|---|---|
| KR | 2003-0079460 A | 10/2003 |
| KR | 10-1406983 B1 | 6/2014 |

(Continued)

*Primary Examiner* — Shreyans A Patel
(74) *Attorney, Agent, or Firm* — Birch, Stewart, Kolasch & Birch, LLP

(57) ABSTRACT

Provided is an artificial intelligence (AI) apparatus for generating a speech having a content-based style, including: a memory configured to store a plurality of TTS (Text-To-Speech) engines; and a processor configured to: obtain image data or text data containing a text, extract at least one content keyword corresponding to the text, determine a speech style based on the extracted content keyword, generate a speech corresponding to the text by using a TTS engine corresponding to the determined speech style among the plurality of TTS engines, and output the generated speech.

17 Claims, 11 Drawing Sheets

(56) References Cited

U.S. PATENT DOCUMENTS

| | | | |
|---|---|---|---|
| 2011/0112825 A1* | 5/2011 | Bellegarda | G06F 40/30 |
| | | | 704/E13.011 |
| 2016/0163332 A1 | 6/2016 | Un et al. | |
| 2017/0186418 A1* | 6/2017 | Mairano | G10L 13/07 |
| 2017/0213542 A1* | 7/2017 | Spencer | G10L 13/0335 |
| 2019/0295527 A1* | 9/2019 | Pore | G06F 40/263 |

FOREIGN PATENT DOCUMENTS

| | | |
|---|---|---|
| KR | 10-2014-0123715 A | 10/2014 |
| KR | 10-2017-0092603 A | 8/2017 |

\* cited by examiner

ARTIFICIAL INTELLIGENCE APPARATUS FOR GENERATING TEXT OR SPEECH HAVING CONTENT-BASED STYLE AND METHOD FOR THE SAME

CROSS REFERENCE TO RELATED APPLICATIONS

This application is the National Phase of PCT/KR2019/006093 filed on May 21, 2019, which is hereby expressly incorporated by reference into the present application.

TECHNICAL FIELD

The present invention relates to an artificial intelligence apparatus for generating a text or speech having a style, and a method for the same. In particular, the present invention relates to an artificial intelligence apparatus for determining a style based on content of a text and generating a text or speech having the determined style, and a method for the same.

BACKGROUND ART

There have been requests for a service for generating a speech and a text or converting a speech to a text or a text to a speech. A service for converting a speech into a text is used to automatically generate captions in a video medium or used in various services based on voice recognition, and a service for converting a text into a speech is used in a voice guidance service.

However, conventionally, a service for converting a text to a speech only uses a predetermined Text-To-Speech (TTS) engine and cannot reflect various speech styles. In addition, there is no service for generating a text having a style based on content. In addition, texts written by the same user have all been converted into speeches having the same style.

DISCLOSURE OF THE INVENTION

Technical Problem

An object of the present invention is to provide an artificial intelligence apparatus and method for generating and outputting a speech or text having a style corresponding to the content of an acquired text when the text is acquired.

In addition, an object of the present invention is to provide an artificial intelligence apparatus and method for generating a speech or text having a style for each predetermined unit with respect to the acquired text.

Technical Solution

According to an embodiment of the present invention, there is provided an artificial intelligence apparatus for extracting a content keyword for an obtained text when a text is obtained, determining a speech style for the extracted content keyword, generating a speech corresponding to the obtained text using a text-to-speech (TTS) engine corresponding to the determined speech style, and outputting the generated speech, and a method for the same.

Further, according to an embodiment of the present invention, there is provided an artificial intelligence apparatus for extracting a content keyword for an obtained text when a text is obtained, determining a text style for the extracted content keyword, generating a text corresponding to the obtained text using a text generation engine corresponding to the determined text style, and outputting the generated text, and a method for the same.

Further, according to an embodiment of the present invention, there is provided an artificial intelligence apparatus for extracting a content keyword for each present unit for an obtained text, and determining a speech/text style for the each preset unit based on the content keyword extracted for the each preset unit.

Advantageous Effects

According to various embodiments of the present invention, by determining a speech/text style in consideration of the content of an inputted text and generating a speech or text according to the determined style, an emotional service capable of providing a user with a speech or text suitable for the content of a certain text may be provided.

In addition, according to various embodiments of the present disclosure, by generating and providing a speech or text having a different style for each unit such as a word or a clause smaller than a sentence of a certain text, it is possible to provide a speech or text having more various content styles and more effectively emphasize specific units (words, clauses, etc.) within sentences.

MODE FOR CARRYING OUT THE INVENTION

Figure 1:
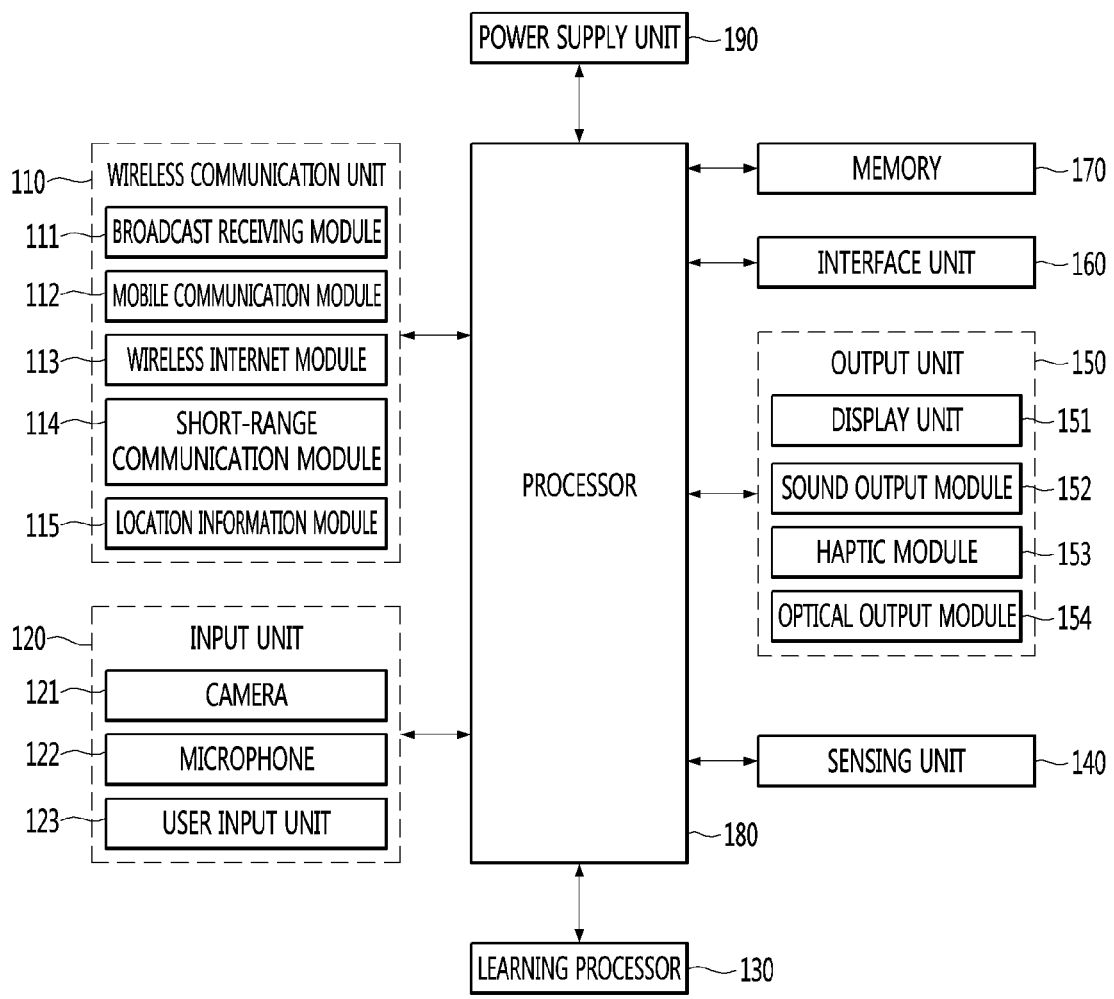
FIG. 1 is a block diagram illustrating a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be learned by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN learned based on training data may classify or cluster input data, based on a pattern of the input data.

In this specification, an ANN learned based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be learned in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be learned by receiving and using data which does not deceive the discriminator, and the discriminator may be learned by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of the terminal 100 according to an embodiment of the present invention.

Hereinafter, the terminal 100 may be called an artificial intelligence (AI) apparatus 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
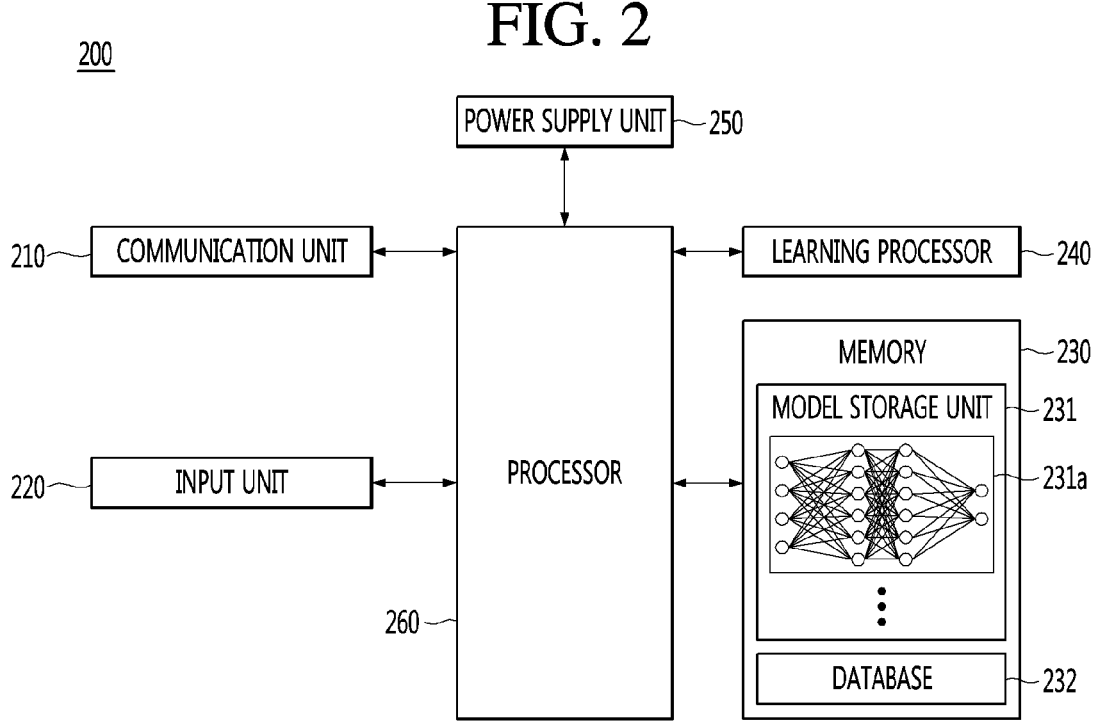
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
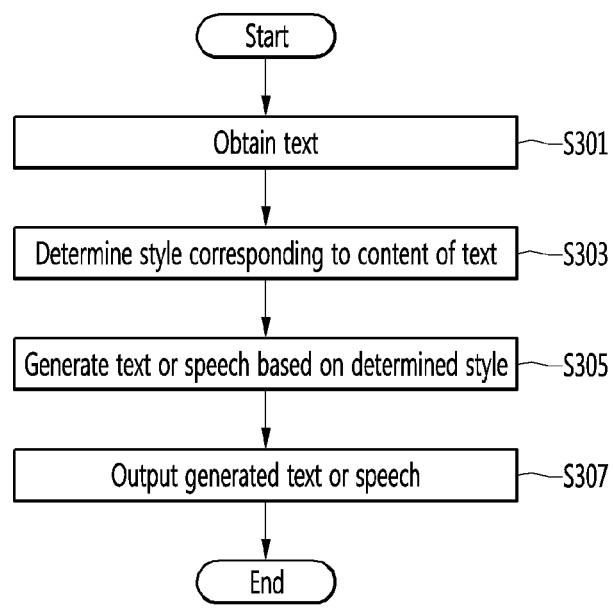
FIG. 3 is a flowchart illustrating a method of generating a text or speech having a content-based style according to an embodiment of the present invention.

FIG. 3 is a flowchart illustrating a method of generating a text or speech having a content-based style according to an embodiment of the present invention.

Specifically, FIG. 3 illustrates a method of determining a style corresponding to the content of a text when the text is input, and generating and outputting a text or speech having the determined style from the input text.

Referring to FIG. 3, a processor 180 of an artificial intelligence (AI) apparatus 100 obtains a text (S301).

The text may be obtained in the form of text data, or may be obtained in the form of image data including a text.

Here, the processor 180 may obtain text data through a user input unit 123 of an input unit 120.

Here, the processor 180 may obtain text data from an external terminal (not shown) through a wireless communication unit 110. In this case, the text data may be obtained by a user input unit (not shown) provided in an external terminal (not shown).

Here, the processor 180 may obtain image data including a text through a camera 121 of the input unit 120.

Here, the processor 180 may obtain image data including a text from an external terminal (not shown) through the wireless communication unit 110. In this case, the image data may be obtained by a camera (not shown) provided in an external terminal (not shown).

The image data may be generated by being photographed by a camera or scanned by a scanner.

The image data may have various formats. For example, the format of the image data may include jpg, jpeg, png, bmp, tif, tiff, and the like.

The image data may include a text, and the text may include a handwritten text, a printed text, a text output through a display device, and the like. That is, the image data may include image data generated by photographing an image output from an electronic device having a display unit such as a TV, a monitor, or a smartphone, or may include image data itself output from the electronic device.

When the processor 180 acquires image data including a text, the processor 180 may acquire text data by recognizing the text from the image data.

The processor 180 may adjust the size, resolution, color, format, etc. of the image data as a pre-processing operation in order to use the image data.

If the processor 180 acquires image data having a format that is different from that of image data that the processor 180 can handle, the processor 180 may perform a pre-processing operation of adjusting the size, resolution, color, format, etc. of the image data according to the format of the image data that may be handled.

Hereinafter, the image data may refer to image data, which may be handled by the processor 180, after the pre-processing operation.

The processor 180 of the artificial intelligence apparatus 100 determines a style corresponding to the content of a text (S303).

The processor 180 may determine a style based on the content of the text. Here, the style may mean at least one of a speech style or a text style.

For example, the speech style may include a news style of an announcer, a fairy tale style of a voice actor, an entertainment style of a celebrity, and the like, and specifically, a speech style corresponding to a speech style of a specific actor, voice actor, announcer, or the like may be included.

For example, the text style may include a newspaper style, a news style, a fairy tale style, an entertainment style, a magazine style, and the like, and specifically, a text style corresponding to a text style of a specific medium may be included.

The processor 180 may extract at least one content keyword from a text or image data, and determine a style based on the extracted content keyword.

The text style can be specified according to text style features. Here, if there is a difference even in one text style feature, it may be regarded as indicating a different text style.

The text style feature may include at least one of a language, a text size, a first letter size, an initial consonant size, a font, a color, a pen pressure, a writing speed, an angle, regularity, a horizontal degree, a line spacing, or a letter spacing.

Each text style may be composed of preset text style features. In this case, each preset text style can be viewed as a preset for text style features.

The speech style can be specified according speech style features. Here, if there is a difference even in one speech style feature, it may be regarded as indicating a different speech style.

The speech style feature may include at least one of a tone, a pitch, a speed, an accent, a speech volume, or pronunciation.

Each speech style may be composed of preset speech style features. In this case, each preset speech style can be viewed as a preset for speech style features.

In particular, the processor 180 may determine a style for each preset unit such as a sentence unit, a word unit, and the like, and generate a text or speech based on the style determined for each unit.

For example, when a specific word indicates a specific medium, the processor 180 may determine the word to have a style corresponding to the medium, unlike other words in the same sentence.

The processor 180 of the artificial intelligence apparatus 100 generates a text or speech corresponding to the obtained text based on the determined style (S305).

The processor 180 may generate a speech corresponding to a text obtained by using a text-to-speech (TTS) engine corresponding to the determined speech style, or may generate a 180 acquired by using a text generation engine corresponding to the determined text style.

The text generation engine may mean an engine that generates a text having a specific style.

Here, the generated text or speech has the same content as that of the acquired text. However, when a text is generated, there may be a difference in style even when the contents are the same.

Here, the TTS engine may mean an engine for converting text data into speech data, and the text generation engine may mean an engine for converting text data into text data having a specific text style.

The TTS engine or the text generation engine may be composed of artificial neural networks, and may be learned using a machine learning algorithm or a deep learning algorithm.

The TTS engine or the text generation engine may be directly learned in the learning processor 130 or may be learned and received in a learning processor 240 of a learning device 200.

The memory 170 may store each of TTS engines corresponding to each of the plurality of speech styles or each of text generation engines corresponding to each of the plurality of text styles.

In this case, each of the TTS engines stored in the memory 170 is a TTS engine that converts a text into a speech having a predetermined speech style feature, and may be viewed as a TTS engine preset.

Similarly, each of the text generation engines stored in the memory 170 is an engine for converting a text into a text having a predetermined text style feature, which can be viewed as a text generation engine preset.

For example, the memory 170 may store a TTS engine corresponding to a news style of a male/female announcer, a TTS engine corresponding to a fairy tale style of a voice actor, a TTS engine corresponding to an entertainment style of a celebrity, and the like.

Further, the processor 180 may generate a voice corresponding to a text by using the TTS engine stored in the memory 170 or generate a text corresponding to the text by using the text generation engine stored in the memory 170.

Alternatively, the processor 180 may adjust the speech style feature for a default TTS engine based on the speech style determined with respect to the default TTS engine stored in the memory 170, and may generate a speech corresponding to the text using the adjusted default TTS engine.

Similarly, the processor 180 may adjust the text style feature for a default text generation engine based on the text style determined with respect to the default speech generation engine stored in the memory 170 and may generate a text corresponding to the text using the adjusted text generation engine.

If there is text information on the image data or text data is directly input, the processor 180 may generate a text or a speech corresponding to the determined style without a separate text recognition process.

If there is no text information on the image data, the processor 180 may recognize the text in the image data using a text recognition engine or a text recognition model, and generate a text or speech corresponding to the determined style.

The text recognition model or the text recognition engine refers to a model for recognizing characters in image data.

The text recognition model may be composed of artificial neural networks, and may be learned using a machine learning algorithm or a deep learning algorithm.

The text recognition model may be directly learned in the learning processor 130 or may be learned and received in the learning processor 240 of the learning device 200.

The processor 180 of the artificial intelligence apparatus 100 outputs the generated text or speech (S307).

Here, the processor 180 may output a text generated through a display unit 151 of an output unit 150 or output a speech generated through a sound output unit 152 or a speaker of the output unit 150.

Here, the processor 180 may transmit a text or speech generated to an external terminal (not shown) through the wireless communication unit 110 to thereby output the generated text through the display unit of the external terminal (not shown) or output the generated speech through the speaker.

Figure 4:
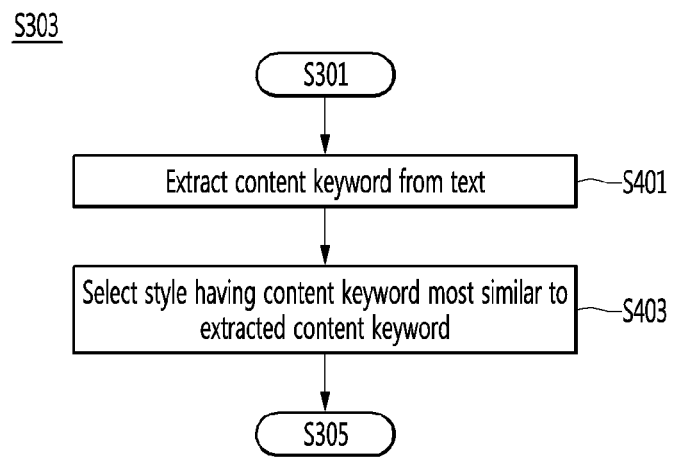
FIG. 4 is a flowchart illustrating an example of a step S303 of determining a style corresponding to the content of the text illustrated in FIG. 3.

FIG. 4 is a flowchart illustrating an example of a step S303 of determining a style corresponding to the content of the text illustrated in FIG. 3.

Referring to FIG. 4, the processor 180 of the artificial intelligence apparatus 100 extracts at least one content keyword from a text (S401).

The content keyword is a keyword that provides information about a content included in a text or a speech and may include a keyword used to identify a content (content identification keyword), a keyword indicating the type of a content (content type keyword), a keyword indicating a mood/feeling of a content (content mood keyword), etc.

For example, content keywords may include warnings, guidance, entertainment magazines, fairy tales, comic books, news, current affairs magazines, etc. as keywords representing the type of content, and keywords that indicate mood/feeling may include hard, accentuating, important, light, stylish, fashionable, trendy, interesting, cute, funny, neat, and the like.

In addition, the keyword used to identify the content may mean a specific keyword that can identify the content. That is, the content identification keyword may mean a keyword for identifying a specific medium indicated by the corresponding content.

For example, when a text includes "XXX", which is the title of a specific broadcast program, the "XXX" may be included in the content keyword as a content identification keyword. That is, the text identification keyword may include a title of a specific broadcast program, a title of a specific movie, a name of a specific person, a title of a specific music, and the like.

Here, the processor 180 may extract the content keyword for each preset unit, such as a sentence unit or a word unit, in the text.

Here, the processor 180 of the artificial intelligence apparatus 100 may extract a content keyword from a text by using a content keyword extraction model.

The content keyword extraction model may refer to a model for extracting a content keyword corresponding to a text in consideration of a text included in a given text data, a text included in image data, an image, and their color or arrangement, etc.

Here, the content keyword extraction model may extract the content keyword based on the text or semantic information of the text included in text data or image data.

For example, when a text keyword or image data includes a text "XX news", the content keyword extraction model may determine the content as the "XX news" and extract content keywords related thereto.

Semantic information of a text may be obtained using a natural language process (NLP) model.

Here, the content keyword extraction model may be formed of an artificial neural network, and may be a model which is learned using text data or image data to which the content keyword is assigned.

The processor 180 of the artificial intelligence apparatus 100 selects a style having a content keyword most similar to the extracted content keyword (S403).

To this end, the processor 180 of the artificial intelligence apparatus 100 may use a mapping relationship between a speech style and a content keyword of the speech style or a mapping relationship between a text style and a content keyword of the text style, and such a mapping relationship may be stored in the memory 170 or in the memory 230 of the learning server 200.

Here, the mapping relationship between the speech style and the content keyword of the speech style may be generated by mapping the content keyword extracted from sound data with its corresponding speech style using the content keyword extraction model, or may be generated by mapping the speech style corresponding to sound data, for which the content keyword is given and which is used for the learning of the content keyword extraction model, with a given content keyword.

Here, the mapping relationship between the text style and the content keyword of the text style may be generated by mapping the content keyword extracted from the image data or the text data with its corresponding text style using the content keyword extraction model, or may be generated by mapping the text style corresponding to image data, for which the content keyword is given and which is used for the learning of the content keyword extraction model, with a given content keyword.

Here, the processor 180 may use a predetermined priority among the respective content keywords, or directly assign the priority to each of the content keywords. Further, the style may be determined for each preset unit based on the priority given to each content keyword. Here, the priorities of the content keywords may be set in the order of the content identification keyword, the content type keyword, and the content mood keyword.

If the title of the article "Movie AAA is successful" is entered, "Article", "News", "Information", etc. may be extracted as content keywords for the article title "Movie AAA is successful.", and "movie" and "AAA", etc. may be extracted as content keywords for the movie title "AAA". In this case, the processor 180 determines the style corresponding to the article, the news, and the information for "movie" and "is successful" and determines the style corresponding to "movie" and "AAA" of a higher priority for the "AAA". Then, a speech or text corresponding to the input text (article title) may be generated based on the determined style.

Figure 5:
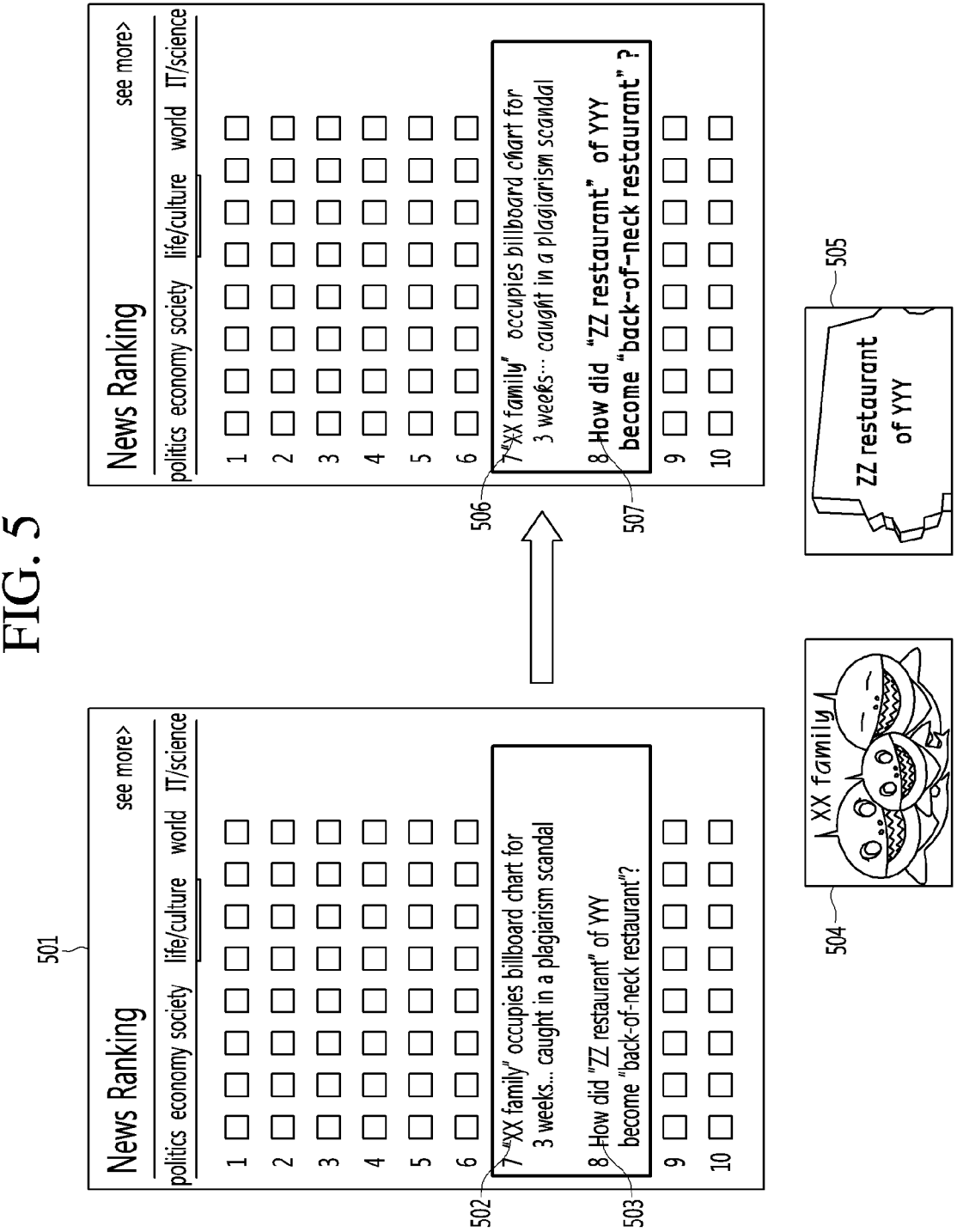
FIGS. 5 and 6 are views illustrating examples of generating a text having a content-based style according to an embodiment of the present invention.
Figure 6:
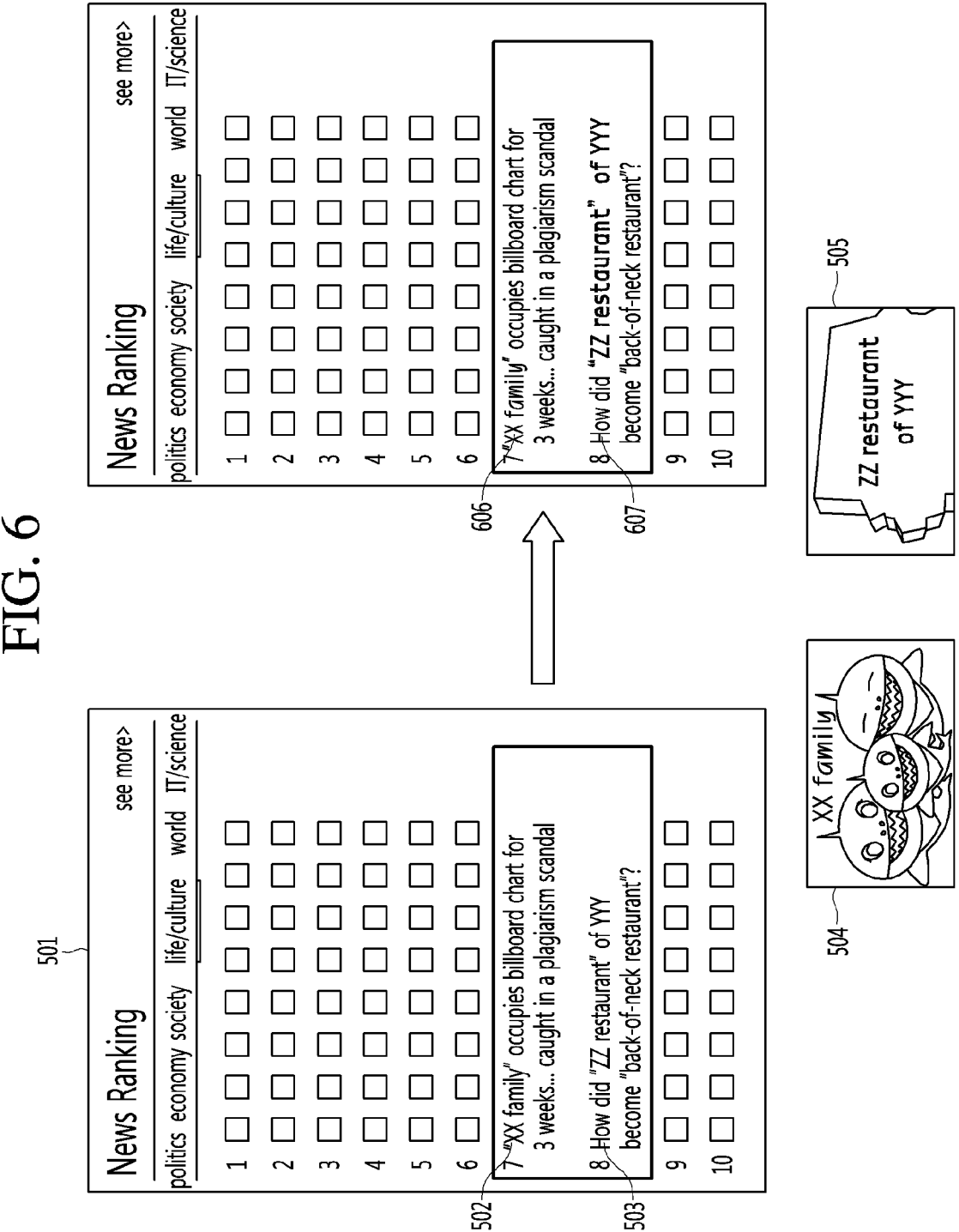

FIGS. 5 and 6 are views illustrating examples of generating a text having a content-based style according to an embodiment of the present invention.

Referring to FIG. 5, when text data or image data for a news ranking 501 is input, the processor 180 of the artificial intelligence apparatus 100 may obtain "XX family" 502, "ZZ restaurant of YYY" 503, etc. as content keywords.

In addition, the processor 180 determines that the "XX family" 502 among the content keywords corresponds to the content of the "XX family" 504 and determines the style of the entire sentence as the style of "XX family" 504, and generates a text 506 according to the determined style of "XX family" 504 and outputs the generated text 506.

Similarly, the processor 180 determines that the "ZZ restaurant of YYY" 503 among the content keywords corresponds to the content of "ZZ restaurant of YYY" 505 and determines the style of the entire sentence as "ZZ restaurant of YYY" 505, and generates a text 507 according to the determined style of "ZZ restaurant of YYY" 505 and outputs the generated text 507.

Referring to FIG. 6, when text data or image data for a news ranking 501 is input, the processor 180 of the artificial intelligence apparatus 100 may obtain "XX family" 502, "ZZ restaurant of YYY" 503, etc. as content keywords.

In addition, the processor 180 determines that the "XX family" 502 among the content keywords corresponds to the content of the "XX family" 504 and determines the style of the word corresponding to the content keyword as the style of "XX family" 504, and generates a text 606 according to the determined style of "XX family" 504 and outputs the generated text 606.

Similarly, the processor 180 determines that the "ZZ restaurant of YYY" 503 among the content keywords corresponds to the content of "ZZ restaurant of YYY" 505 and determines the style of the word corresponding to the content keyword as "ZZ restaurant of YYY" 505, and generates a text 607 according to the determined style of "ZZ restaurant of YYY" 505 and outputs the generated text 607.

Figure 7:
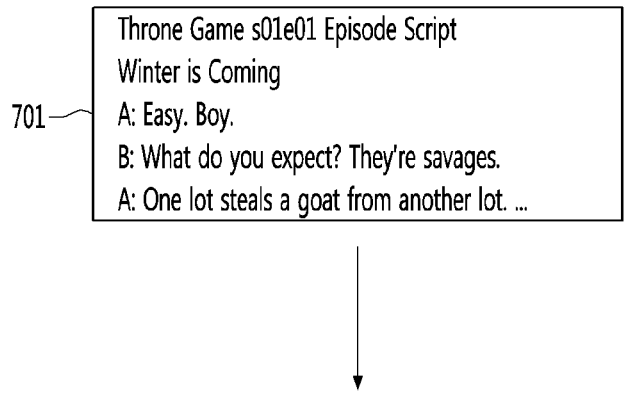
FIGS. 7 and 8 are views illustrating examples of generating a text or speech having a content-based style according to an embodiment of the present invention.
Figure 7:
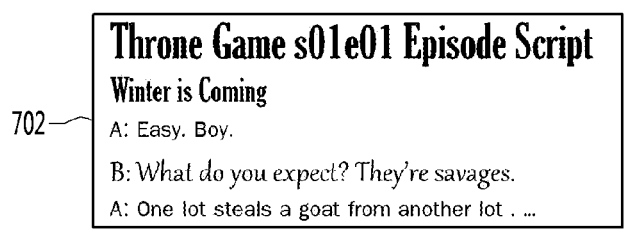
Figure 8:
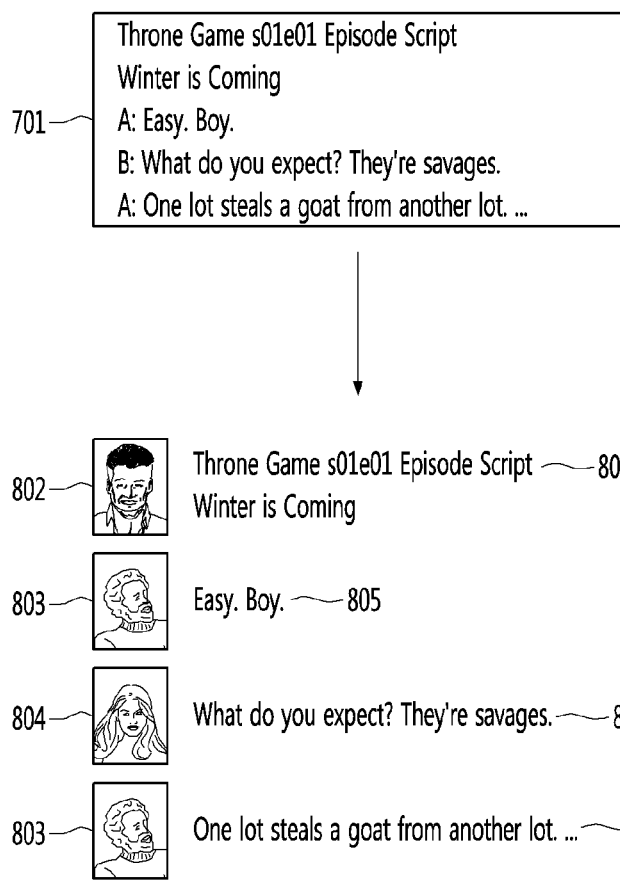

FIGS. 7 and 8 are views illustrating examples of generating a text or speech having a content-based style according to an embodiment of the present invention.

Referring to FIGS. 7 and 8, when text data or image data for a drama script 701 is input, the processor 180 of the artificial intelligence apparatus 100 may determine that the input text is a drama script by extracting content keywords. In addition, the processor 180 may classify the title and the dialogue through the content keywords and may distinguish the speaker of each dialogue.

Here, the processor 180 may determine the type, intent, or speaker of the input text using NLP model.

In addition, the processor 180 may determine a style having a handwriting corresponding to the drama script.

Here, the title and the dialogue may be distinguished from each other to determine the style, and the speakers may also be distinguished from each other to determine the style. The text 702 or the speeches 804 to 807 corresponding to the drama script may be generated and output according to the determined style.

Specifically, a speech 804 having a first speech style 802 may be generated for the title, speeches 805 and 807 having a second speech style 803 may be generated for the dialogue of speaker A, a speech 806 having a third speech style 804 may be generated for the dialogue of speaker B, and the generated speeches 804 to 807 may be output.

Figure 9:
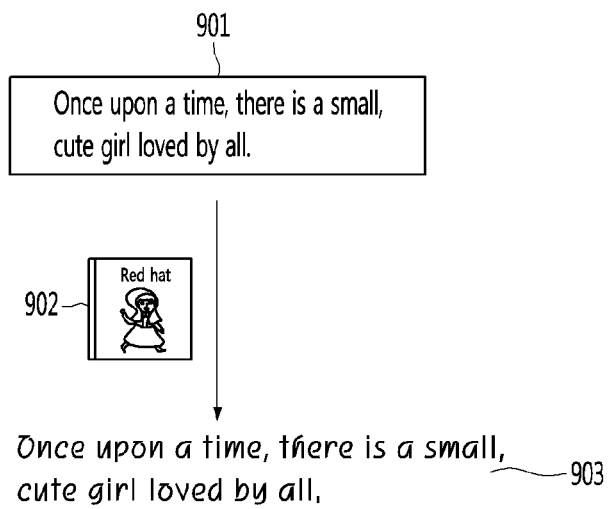
FIGS. 9 and 10 are views illustrating examples of generating a text having a content-based style according to an embodiment of the present invention.
Figure 10:
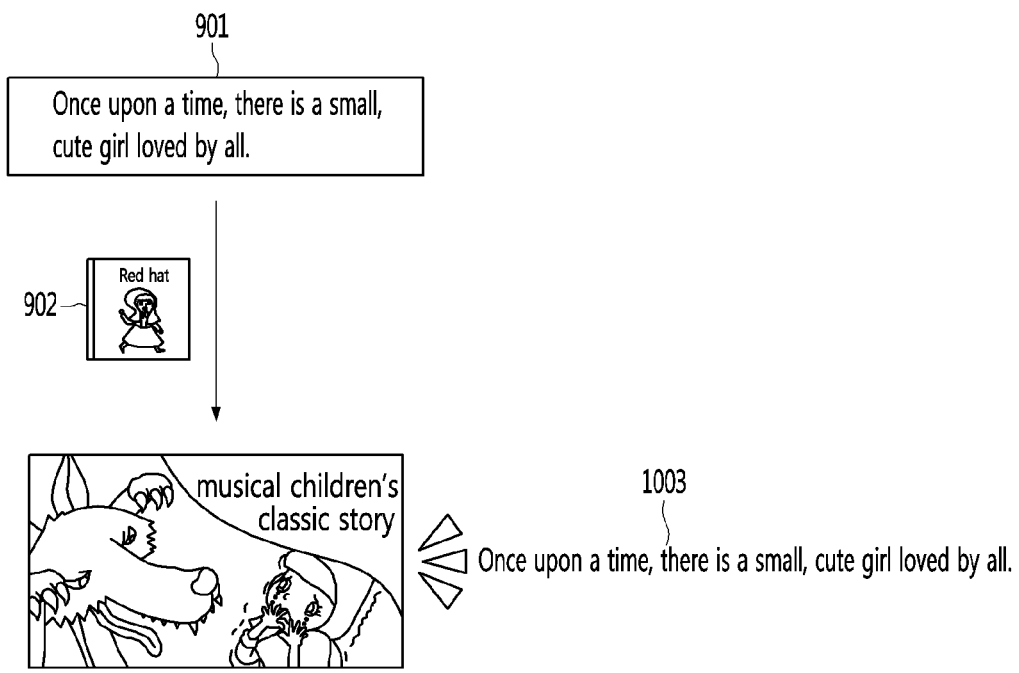

FIGS. 9 and 10 are views illustrating examples of generating a text having a content-based style according to an embodiment of the present invention.

Referring to FIGS. 9 and 10, when text data or image data for a fairy tale 901 is input, the processor 180 of the artificial intelligence apparatus 100 may determine that the input text is a fairy tale by extracting content keywords.

In addition, the processor 180 may determine a style having a handwriting corresponding to the moving picture. A text 903 or a speech 1003 corresponding to the fairy tale may be generated and output according to the determined style.

Figure 11:
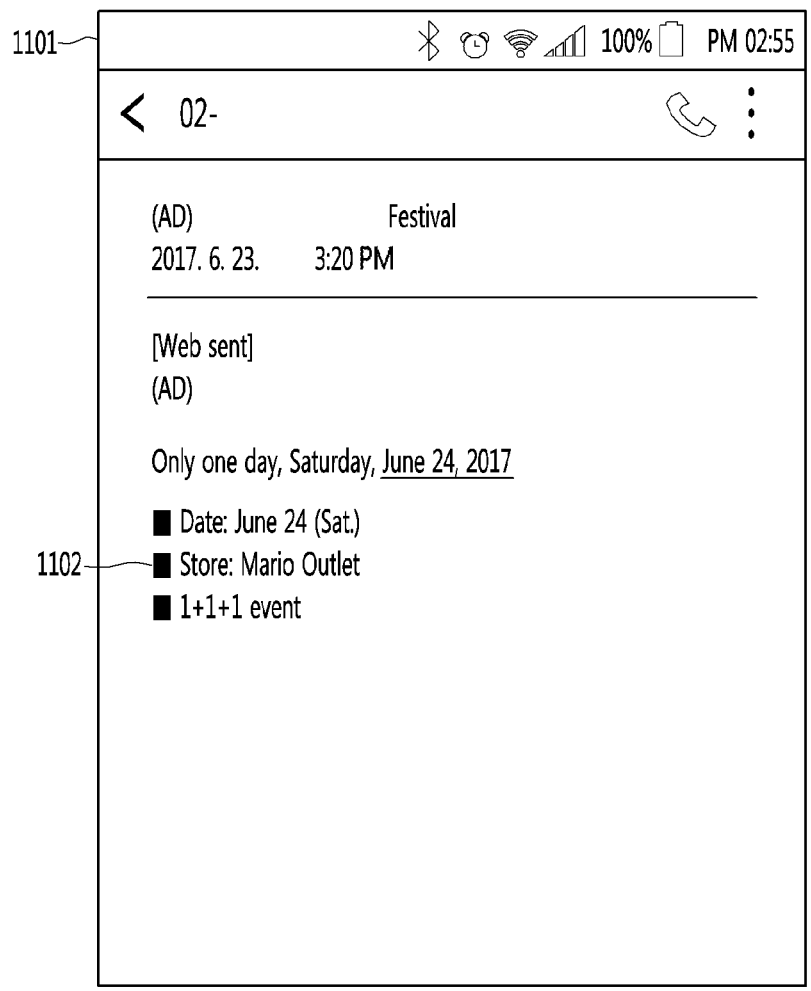
FIG. 11 is a view illustrating an example of generating a speech having a content-based style according to an embodiment of the present invention.

FIG. 11 is a view illustrating an example of generating a speech having a content-based style according to an embodiment of the present invention.

Referring to FIG. 11, when text data or image data of an advertisement 1101 is input, the processor 180 of the artificial intelligence apparatus 100 may identify an advertised product or an advertised store 1102 by extracting a content keyword.

In addition, the processor 180 may generate and output sounds of a theme song 1103 of the corresponding advertised store 1102.

Embodiments of the present invention may be applied to various terminal devices to thereby mutually convert and output speeches and texts.

For example, in a refrigerator having a touch panel for inputting a handwriting of a user, a display for outputting the inputted handwriting, and a speaker for outputting sounds, when a plurality of users inputs a handwriting through the touch panel, the display may output the inputted handwriting, the processor may convert each handwriting into a speech according to its corresponding speech style, and output the speech, which is converted by the user's interaction or automatically, through the speaker.

Similarly, in a refrigerator having a microphone for inputting a user's voice and a display for outputting a text, when a plurality of users input speeches through the microphone, the processor may convert each speech into a text according to a corresponding text style and output the text, which is converted by the interaction of the user or automatically, through the display.

Accordingly, a service for converting a speech or a text into a state having a similar style can be provided to the user. In addition, an STT service or a TTS service including emotion may be provided.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

The invention claimed is:

1. An artificial intelligence (AI) apparatus for generating a speech having a content-based style, the AI apparatus comprising:
   a memory configured to store a plurality of TTS (Text-To-Speech) engines; and
   a processor configured to:
      obtain image data or text data containing a text including a plurality of different handwriting styles,
      extract at least one content keyword per predetermined unit for the text, the predetermined unit being one of a sentence unit or a word unit included in the text,
      determine different speech styles, respectively, mapped with the extracted content keywords within the text based on the extracted content keywords within the text and the plurality of different handwriting styles,
      generate a speech corresponding to the text by using a TTS engine corresponding to each of the determined one or more speech styles among the plurality of TTS engines, and
      output the generated speech,
   wherein the generated speech output by the processor includes at least two different voice styles for two different predetermined units within the text,
   wherein the generated speech output by the processor includes successively outputting first audio for a first predetermined unit of text using a first voice and second audio for a second predetermined unit of text using a second voice different than the first voice, and the first and second predetermined units are adjacent to each other within the text, and
   wherein the first voice is determined based on a first handwriting style included in the text and the second voice is determined based on a second handwriting style included in the text.

2. The AI apparatus of claim 1, wherein the processor is configured to select a speech style having a content keyword which is most similar to the extracted content keywords.

3. The AI apparatus of claim 2, wherein the content keyword includes at least one of an identification keyword for a content of the text, a type keyword indicating a type of the content, or a mood keyword indicating a mood of the content.

4. The AI apparatus of claim 3, wherein the identification keyword is a keyword for identifying media indicated by the content and includes at least one of a broadcast program title, a movie title, a music title, or a person's name.

5. The AI apparatus of claim 1, wherein the processor is configured to determine the speech style per the predetermined unit by using priority information between the extracted content keywords.

6. The AI apparatus of claim 1, wherein each of the plurality of TTS engines includes at least one speech style feature, and
   wherein the speech style feature includes at least one of a tone, a pitch, a speed, an accent, a speech volume, or a pronunciation.

7. The AI apparatus of claim 1, wherein the processor is configured to extract the content keyword by using a content keyword extraction model, and
   wherein at least one of the plurality of TTS engines and the content keyword extraction model is learned by using a machine learning algorithm or a deep learning algorithm.

8. The AI apparatus of claim 1, wherein the processor is further configured to:
obtain image data or text data containing a first text,
extract at least one first content keyword corresponding to the first text,
determine a text style based on the extracted at least one first content keyword,
generate a second text corresponding to the first text by using a text-generating engine corresponding to the determined text style among the plurality of text-generating engines, and
output the generated second text.

9. The AI apparatus of claim 8, wherein the processor is configured to select the text style having a first content keyword which is most similar to the extracted at least one first content keyword.

10. The AI apparatus of claim 9, wherein the first content keyword includes at least one of a first identification keyword for a content of the first text, a type keyword indicating a type of the content, or a mood keyword indicating a mood of the content.

11. The AI apparatus of claim 10, wherein the first identification keyword is a keyword for identifying media indicated by the content of the first text and includes at least one of a broadcast program title, a movie title, a music title, or a person's name.

12. The AI apparatus of claim 10, wherein the processor is configured to determine the text style by extracting a content keyword per predetermined unit for the first text and generate the second text corresponding to the first text based on the text style which is determined per the predetermined unit.

13. The AI apparatus of claim 12, wherein the processor is configured to determine the text style per the predetermined unit by using priority information between the extracted content keywords.

14. The AI apparatus of claim 8, wherein each of the plurality of text-generating engines includes at least one text style feature, and
wherein the text style feature includes at least one of a text size, a first letter size, an initial consonant size, a font, a color, a pen pressure, a writing speed, an angulated degree, regularity, a horizontal degree, a space between two adjacent lines, or a space between two adjacent letters.

15. The AI apparatus of claim 1, wherein the at least two different voice styles include a news style of a male or female announcer, a fairy tale style of a voice actor, an entertainment style of a celebrity, or a speech style of a specific actor.

16. The AI apparatus of claim 1, further comprising:
a touch panel configured to receive handwriting inputs; and
a speaker configured to output audio,
wherein the processor is further configured to:
receive, via the touch panel, a plurality of different handwriting inputs from a plurality of users,
covert the plurality of different handwriting inputs into a plurality of different speaker voices, each of the plurality of different handwriting inputs corresponding to a different speech style, and
output, via the speaker, the plurality of different speaker voices for the plurality of different handwriting inputs.

17. The AI apparatus of claim 1, wherein the processor is further configured to:
assign priorities to the extracted content keywords within the text, and
determine a speech style for a unit of the text based on a corresponding priority among the priorities,
wherein the priorities are set in an order of a content identification keyword, a content type keyword and a content mood keyword.

* * * * *